(12) United States Patent
Ozaki et al.

(10) Patent No.: US 7,230,547 B2
(45) Date of Patent: Jun. 12, 2007

(54) INDICATOR LIGHT APPARATUS OF MARINE VESSEL

(75) Inventors: Atsufumi Ozaki, Kobe (JP); Keiji Takahashi, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 149 days.

(21) Appl. No.: 11/074,580

(22) Filed: Mar. 7, 2005

(65) Prior Publication Data

US 2005/0200468 A1 Sep. 15, 2005

(30) Foreign Application Priority Data

Mar. 8, 2004 (JP) ............................. 2004-064464

(51) Int. Cl.
*G08B 23/00* (2006.01)

(52) U.S. Cl. ...................... 340/984; 340/466; 340/425; 362/477

(58) Field of Classification Search ........ 340/984–987, 340/466, 850, 851; 362/477; 114/15
See application file for complete search history.

(56) References Cited

U.S. PATENT DOCUMENTS

| | | | | |
|---|---|---|---|---|
| 3,691,525 A | * | 9/1972 | McClellan et al. | ......... 340/466 |
| 3,774,152 A | * | 11/1973 | Tandy | ......... 340/464 |
| 3,919,689 A | * | 11/1975 | Despain | ......... 340/466 |
| 5,656,992 A | * | 8/1997 | McNeill | ......... 340/441 |
| 6,231,217 B1 | * | 5/2001 | Krippelz, Sr. | ......... 362/477 |
| 6,583,569 B1 | * | 6/2003 | Wang | ......... 315/79 |
| 6,637,915 B2 | * | 10/2003 | von Wolske | ......... 362/477 |
| 6,789,928 B2 | * | 9/2004 | Khan | ......... 362/500 |
| 2005/0195073 A1 | * | 9/2005 | Subbaraman | ......... 340/465 |
| 2006/0028330 A1 | * | 2/2006 | Gallant et al. | ......... 340/441 |

FOREIGN PATENT DOCUMENTS

| JP | SHO61-244689 | 10/1986 |
|---|---|---|
| JP | SHO61-180407 U | 11/1986 |
| JP | SHO61-182393 U | 11/1986 |

* cited by examiner

*Primary Examiner*—Jeffery Hofsass
*Assistant Examiner*—Hoi C. Lau
(74) *Attorney, Agent, or Firm*—Alleman Hall McCoy Russell & Tuttle LLP

(57) ABSTRACT

An indicator light apparatus of a marine vessel is provided. The indicator light apparatus includes a sensor for detecting a value related to a traveling speed of the marine vessel, an indicator light provided in the marine vessel, and a control device configured to change an illuminating pattern of the indicator light based on the value related to the traveling speed detected by the sensor.

14 Claims, 5 Drawing Sheets

INDICATOR LIGHT APPARATUS OF MARINE VESSEL

TECHNICAL FIELD

The present invention relates to an indicator light apparatus of a marine vessel, and more particularly, to an indicator light apparatus capable of changing an illuminating pattern based on an operational state of the marine vessel.

BACKGROUND OF THE INVENTION

A marine vessel typically is equipped with an indicator light for nighttime use and, thus, an operational state, such as an orientation, a traveling direction, and a speed of the marine vessel can be visually ascertained by others to a certain degree. However in some cases, even surrounding objects may not be visible at night, and a mere indicator light is not sufficient to display a dynamic operational state, such as the traveling direction and speed of the marine vessel.

BRIEF SUMMARY OF THE INVENTION

The present invention addresses the above-mentioned conditions and, therefore, provides an improved indicator light apparatus of a marine vessel.

The indicator light apparatus of the marine vessel includes a sensor for detecting a value related to a traveling speed of the marine vessel, an indicator light provided in the marine vessel, and a control device configured to change an illuminating pattern of the indicator light based on the value related to the traveling speed detected by the sensor.

In one aspect of the present invention, the indicator light apparatus is able to more objectively indicate an operational condition of the marine vessel, for example, a traveling speed, to other persons in the vicinity. It may also be possible to more objectively indicate other operational conditions, such as a posture and a direction of the marine vessel (including a traveling direction and orientation) to other persons depending on an arrangement of the indicator light of the marine vessel (for example, an installation position, an illuminating pattern, etc.).

The sensor may be at least one of a traveling speed sensor, a throttle opening sensor of an engine, and an engine speed sensor. If the sensor is the traveling speed sensor, the traveling speed can be obtained directly. Moreover, if the sensor is one of the throttle opening sensor, an engine speed sensor, etc., an obtained sensor value may be used as a substitution of the traveling speed. In addition, the substitute traveling sensor value may indicate an operational condition by an operator of the marine vessel which is not immediately reflected to the traveling speed (e.g., in a case of an engine stop).

The illuminating pattern of the indicator light which the control device changes may include a change in intensity of illumination of the indicator light. This change in intensity may be achieved by turning the indicator light on and off, (illuminating/non-illuminating the indicator light), or by changing the brightness of the indicator light. The illuminating pattern may also include a change in illuminating color by the indicator light. Furthermore, the illuminating pattern may include a change in character(s) and/or figure(s) displayed in the indicator light. Thus, the illuminating pattern of the indicator light can be designed variously in order to show the operational state more in detail. For example, it is possible to use the indicator light disposed in a front portion of the marine vessel as a traveling speed indicator light to change the illuminating pattern of this indicator light according to the traveling speed.

The above and further objects and features of the invention will more fully be apparent from the following detailed description with accompanying drawings.

DETAILED DESCRIPTION OF THE PREFERRED EMBODIMENTS OF THE INVENTION

The present invention will now be described in detail referring to the accompanying drawings illustrating the embodiments thereof.

Figure 1:
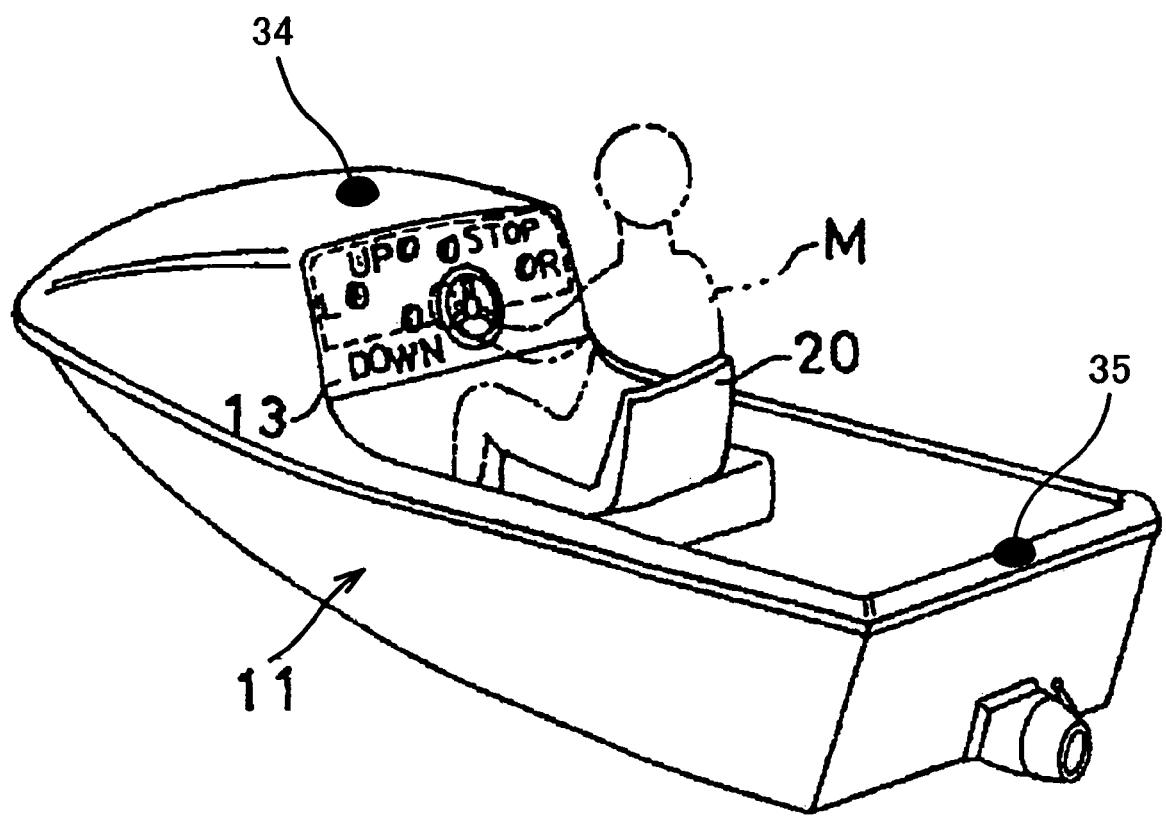
FIG. 1 is a perspective view from left and rear showing the entire configuration of a marine vessel of an embodiment according to the present invention.

FIG. 1 is a perspective view from left and rear showing the entire configuration of a marine vessel of an embodiment according to the present invention. In FIG. 1, an example of the marine vessel is shown as a motorboat 11. The motorboat 11 is for one person and includes a dashboard 13 in front of an operator M who sits in a cockpit 20. The dashboard 13 includes a various kinds of instruments, such as a steering handle, etc.

A front visual indicator 34 is provided in an upper surface of a body of the motorboat 11 in front of the dashboard 13 so that it is easily visible from the front and sides. A rear visual indicator 35 is provided in the body of the motorboat 11 behind the cockpit 20 so that it is easily visible from the rear and sides.

Although a configuration in which two visual indicators, the front visual indicator 34 and the rear visual indicator 35, in front of and behind the body of the motorboat 11 has been described in this embodiment, number or arrangement of the visual indicators may vary depending on the application.

Figure 2:
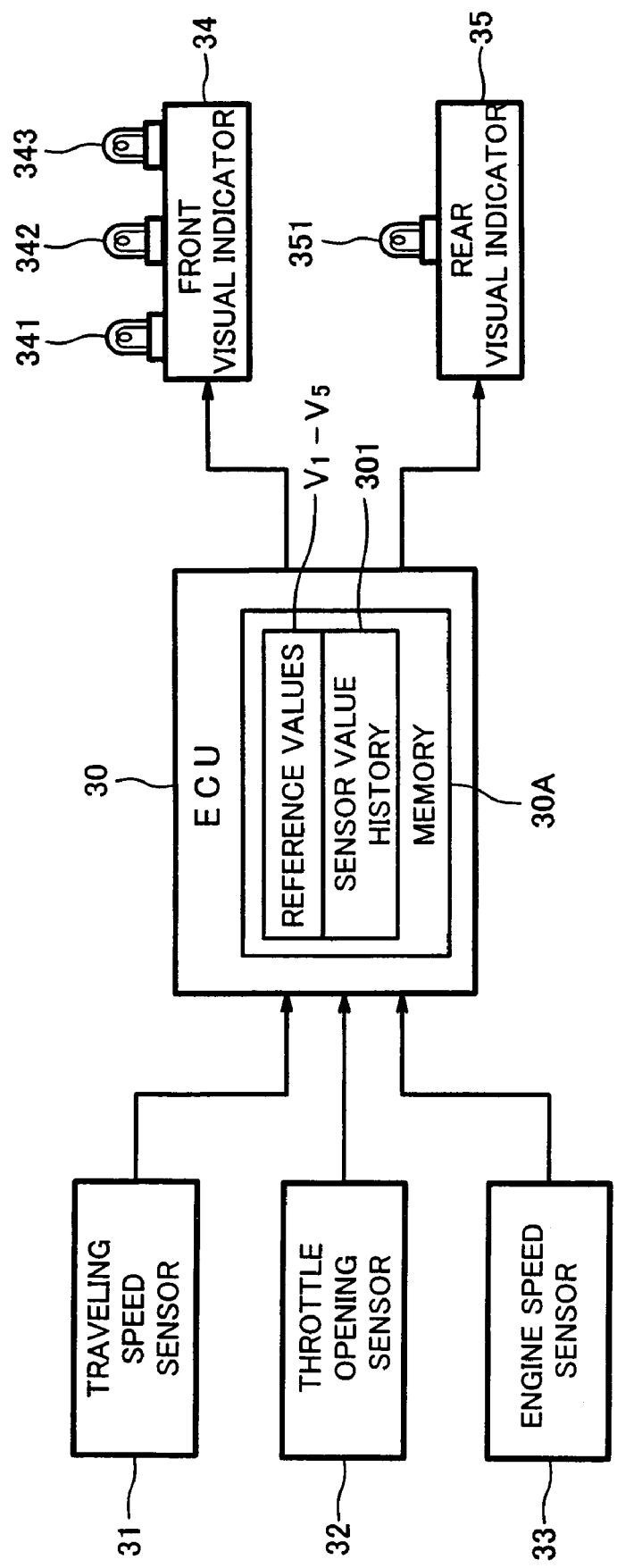
FIG. 2 is a block diagram showing a configuration of the indicator light apparatus of the marine vessel shown in FIG. 1.

In this embodiment, as shown in FIG. 2, the front visual indicator 34 includes three lamps 341, 342, and 343 along the transverse direction in this order. The front visual indicator 34 is configured to display a traveling speed of the motorboat 11 to other persons in the vicinity in accordance with illuminating patterns of these lamps. Similarly, in this embodiment, the rear visual indicator 35 includes a lamp 351 and is configured to display a decrease in the traveling speed of the motorboat 11 to other persons in the vicinity in accordance with the illuminating pattern.

The motorboat 11 typically includes an ECU (Electronic Control Unit) 30. ECU 30 is connected to the front visual indicator 34 and the rear visual indicator 35 as shown in FIG.

2. ECU 30 permits power supply to the front visual indicator 34 and the rear visual indicator 35 when a predetermined condition is met and, thereby, the visual indicators are turned on by a predetermined illuminating pattern. ECU 30 also includes a built-in memory 30A configured to store reference values (V1–V5) with respect to the traveling speed. The reference values may include a throttle opening of an engine, a engine speed, etc. In this embodiment, ECU 30 is connected with a traveling speed sensor 31, a throttle opening sensor 32, and an engine speed sensor 33, all of which are typically equipped in the motorboat 11. ECU 30 permits power supply to the front visual indicator 34 and the rear visual indicator 35 according to values obtained from the sensor and the respective reference values stored in the memory 30A, as will be explained referring to a flowchart of FIG. 3 hereinafter. The traveling speed sensor 31 may be a sensor which directly measures the traveling speed (e.g. a Pitot tube). The traveling speed sensor 31 may also be a sensor which is configured to estimate a traveling speed of the motorboat 11 by calculation. Examples of the latter are to estimate the traveling speed from the sensor value of the engine speed sensor or the throttle opening sensor of the engine, or from a history of these sensor values.

Figure 3:
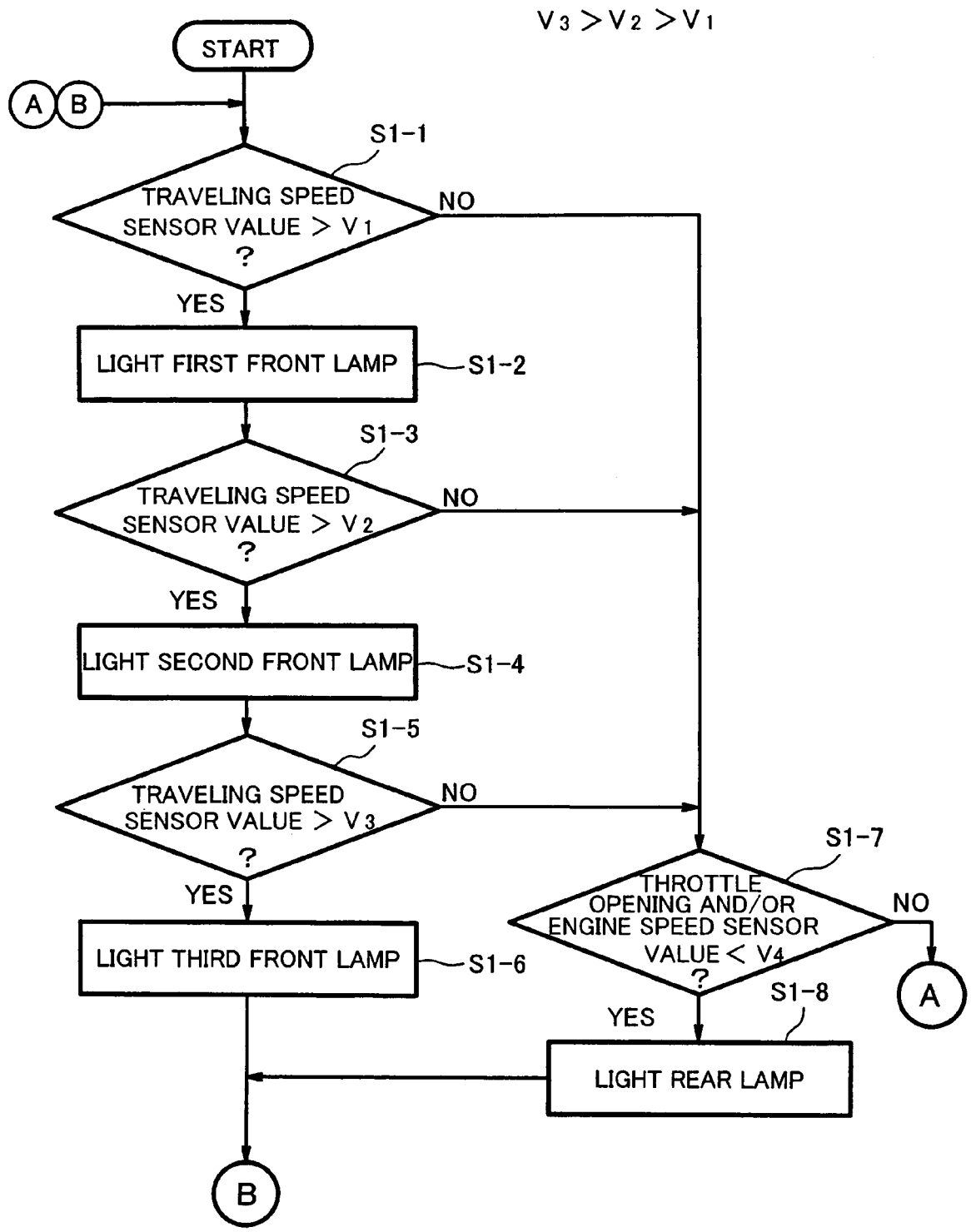
FIG. 3 is a flowchart showing a control procedure of an ECU (Electronic Control Unit) of the indicator light apparatus shown in FIG. 2.

As shown in FIG. 3, ECU 30 reads the traveling speed sensor value of the traveling speed sensor 31 and compares the sensor value with the first traveling speed reference value V1 stored in the built-in memory 30A (Step S1-1). If the sensor value is greater than the first traveling speed reference value V1 ("YES" in Step S-1), ECU 30 turns on the first front lamp 341 (Step S1-2).

Then, ECU 30 compares the traveling speed sensor value with the second traveling speed reference value V2 stored in the built-in memory 30A (Step S1-3). If the sensor value is greater than the second traveling speed reference value V2 ("YES" in Step S1-3), ECU 30 turns on the second front lamp 342 while holding the first front lamp 341 turned on (Step S1-4).

Furthermore, ECU 30 compares the traveling speed sensor value with the third traveling speed reference value V3 stored in the built-in memory 30A (Step S1-5). If the sensor value is greater than the third traveling speed reference value V3 ("YES" in Step S1-5), ECU 30 turns on the third front lamp 343 while holding the first and the second front lamps 341 and 342 turned on (Step S1-6) and, then, returns to Step S1-1.

Although the sensor value of the traveling speed sensor 31 is used in the comparisons of Steps S1-1, S1-3, and S1-5, as mentioned above, it may be substituted with an estimated traveling speed which may be calculated based on a sensor value of the throttle opening sensor 32 and/or the engine speed sensor 33, or history data thereof.

On the other hand, in Step S1-1, if the traveling speed sensor value is less than the first traveling speed reference value V1 ("NO" in Step S1-1), ECU 30 turns off all of the front lamps 341, 342, and 343 (if the lamps are ON). In Step S1-3, if the traveling speed sensor value is less than the second traveling speed reference value V2 ("NO" in Step S1-3), ECU 30 turns off the second and third front lamps 342 and 343 (if the lamps are ON). In Step S1-5, the traveling speed sensor value is less than the third traveling speed reference value V3 ("NO" in Step S1-5), ECU 30 turns off the third front lamp 343 (if the lamp is ON). In addition, the traveling speed reference values in this embodiment are set so that V3>V2>V1.

Then, ECU 30 reads the sensor value of the throttle opening sensor 32 and/or the engine speed sensor 33 and compares the sensor value with the throttle opening sensor and/or the engine speed sensor reference value V4 stored in the built-in memory 30A (Step S1-7). If the sensor value is less than the reference value V4 ("YES" in Step S1-7), ECU 30 determines that the motorboat 11 is in a predetermined decelerating condition and, thereby, ECU 30 turns on the rear lamp 351 (Step S1-8) and, then, it returns to Step S1-1. Similarly, an acceleration of the motorboat 11 may also be displayed.

On the other hand, when the sensor value of the throttle opening sensor 32 and/or the engine speed sensor 33 is greater than the reference value V4 in Step S1-7 ("NO" in Step S1-7), ECU 30 turns off the rear lamp 351 (if the lamp is ON) and, then, it returns to Step S1-1.

Figure 4:
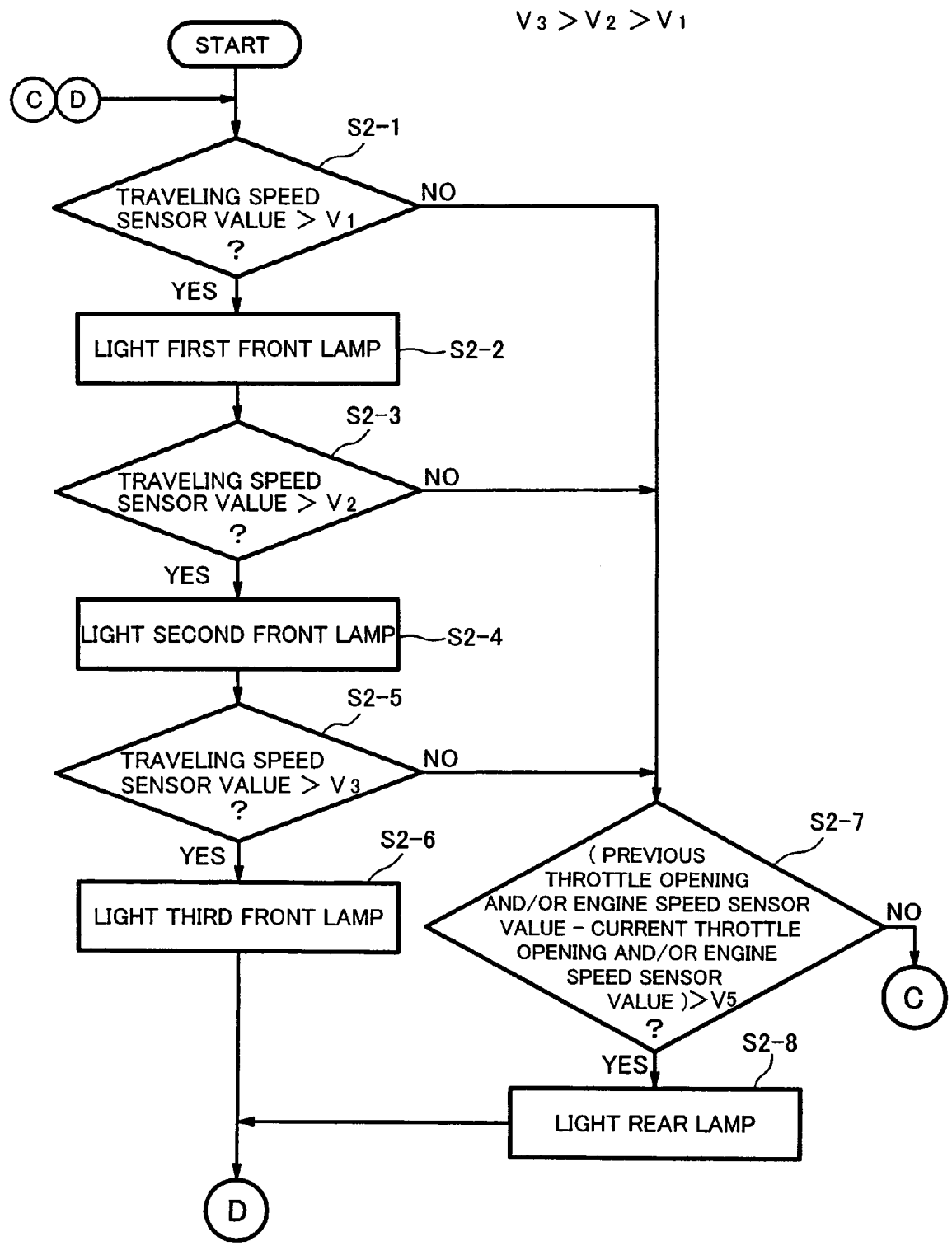
FIG. 4 is a flowchart showing a control procedure of the ECU of the indicator light apparatus shown in FIG. 2 according to another embodiment.

Next, another embodiment will be explained. As shown in FIG. 4, ECU 30 reads, for example, a sensor value of the traveling speed sensor 31 and compares with the first traveling speed reference value V1 stored in the built-in memory 30A (Step S2-1). If the sensor value is greater than the first traveling speed reference value V1 ("YES" in Step S2-1), ECU 30 turns on the first front lamp 341 (Step S2-2).

Then, ECU 30 compares the traveling speed sensor value with the second traveling speed reference value V2 stored in the built-in memory 30A (Step S2-3). If the sensor value is greater than the second traveling speed reference value V2 ("YES" ) in Step S2-3), ECU 30 turns on the second front lamp 342 while holding the first front lamp 341 turned on (Step S2-4).

Furthermore, ECU 30 compares the traveling speed sensor value with the third traveling speed reference value V3 stored in the built-in memory 30A (Step S2-5). If the sensor value is greater than the third traveling speed reference value V3 ("YES" in Step S2-5), ECU 30 turns on the third front lamp 343 while holding the first and the second front lamps 341 and 342 turned on (Step S1-6) and, then, it returns to Step S2-1.

Although the sensor value of the traveling speed sensor 31 is used in the comparisons of Steps S2-1, S2-3, and S2-5, as mentioned above, it may be substituted with an estimated traveling speed which may be calculated based on a sensor value of the throttle opening sensor 32 and/or the engine speed sensor 33, or history data thereof.

On the other hand, when the traveling speed sensor value is less than the first traveling speed reference value V1 in Step S2-1 ("NO" in Step S2-1), ECU 30 turns off all of the front lamps 341, 342, and 343 (if the lamps are ON). In Step S2-3, the traveling sensor value is less than the second traveling speed reference value V2 ("NO" in Step S2-3), ECU 30 turns off the second and the third front lamps 342 and 343 (if the lamps are ON). In Step S2-5, when the traveling speed sensor value is less than the third traveling speed reference value V3 ("NO" in Step S2-5), ECU 30 turns off the third front lamp 343 (if the lamp is ON). Although the control procedure of ECU 30 in this embodiment is so far the same as that of the earlier embodiment, the following control procedures of this embodiment differ in the illuminating conditions of the rear lamp 351 with respect to the earlier embodiment.

ECU 30, for example, reads a sensor value of the throttle opening sensor 32 and/or the engine speed sensor 33 and stores the sensor value in the built-in memory 30A as a current sensor value. Next, ECU 30 reads out the previous sensor value stored in the built-in memory 30A. Then, ECU 30 calculates a difference value between the previous sensor value and the current sensor value, and compares the difference value with a difference reference value V5 stored in the built-in memory 30A (Step S2-7). In this way in this embodiment, the built-in memory 30A stores a history 301 of at least the previous sensor value (for example, the sensor value of the throttle opening sensor 32 and/or the engine speed sensor 33). In this embodiment, it is configured to calculate the difference value between the two values. However, it may be configured to calculate a moving average from the history 301 which is configured to hold more than two sensor values. Therefore, the difference reference value V5 used as a reference of the comparison may vary depend on a type of the values such as described above.

If the difference value is greater than the difference reference value V5 ("YES" in Step S2-7), ECU 30 determines that the motorboat 11 is in a predetermined decelerating or accelerating condition. Thereby ECU 30 turns on the rear lamp 351 (Step S2-8) and, then, it returns to Step S2-1.

On the other hand, in Step S2-7, if the difference value is less than the difference reference value V5 ("NO" in Step S2-7), ECU 30 turns off the rear lamp 351, and, then, it returns to Step S2-1 (if the lamp is ON). Although the determination of the deceleration or acceleration has been made based on the throttle opening and/or the engine speed, the determination also may be made directly based on a difference value of stored traveling speeds.

Figure 5:
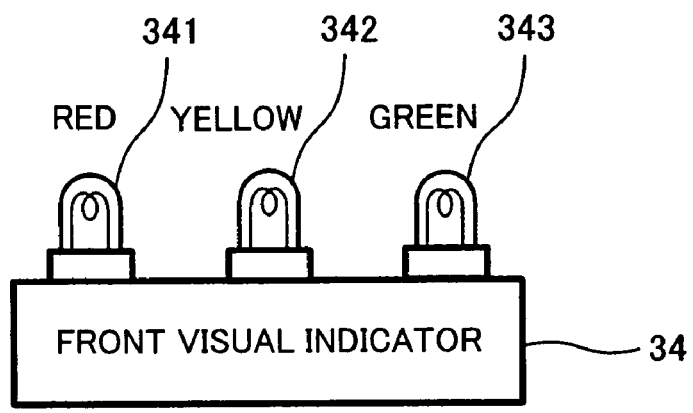
FIG. 5 is a front visual indicator of the indicator light apparatus shown in FIG. 2 according to another embodiment.

As shown in FIG. 5, the front visual indicator 34 may include lamps 341, 342, and 343 with different display colors, in order to indicate the traveling speed of the motorboat 11. For example, as shown in FIG. 5, the first front lamp 341 may be in red, the second front lamp 342 may be in yellow, and the third front lamp 343 may be in green. Instead of using three lamps, it is also possible to adopt a single illuminating device of EL (electroluminescence), liquid crystal, etc. which can itself illuminate in multi-color.

Figure 6:
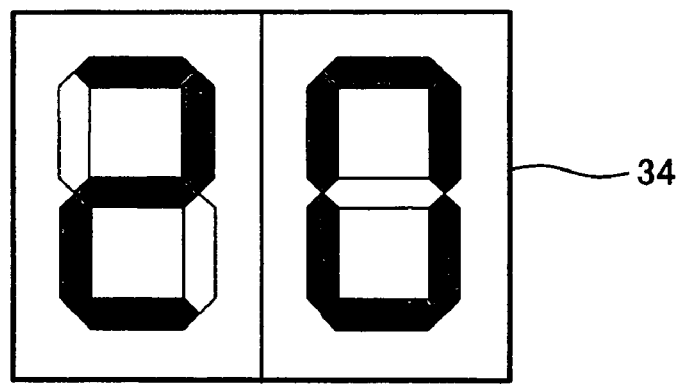
FIG. 6 is a front visual indicator of the indicator light apparatus shown in FIG. 2 according to still another embodiment.

As shown in FIG. 6, the front visual indicator 34 may be an illuminating device which can display a number such as a 7-segment LED (Light Emitting Diode). This type of illuminating device is able to more objectively display the traveling speed of the motorboat 11. Thus, if this type of illuminating device is adopted, gradual steps as shown in the flowchart of FIGS. 3 and 4 are not necessary to take, and it is only necessary to display a value according to the sensor value or the difference value, etc. Although displaying of a number has been explained, displaying of a character and/or a figure may also be possible.

Moreover, in FIGS. 5 and 6, although only the configuration of the front visual indicator 34 has been explained, the same configuration may apply to the rear visual indicator 35.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. An indicator light apparatus of a marine vessel, comprising:
    a sensor for detecting a value related to a traveling speed of the marine vessel;
    an indicator light provided in the marine vessel; and
    a control device configured to change an illuminating pattern of the indicator light based on the value related to the traveling speed detected by the sensor;
    werein the sensor includes at least one of a throttle opening sensor of an engine and an engine speed sensor;
    wherein the control device includes a memory which stores a plurality of predetermined traveling speed reference values, and at least one of a predetermined throttle opening reference value and a predetermined engine speed reference value;
    wherein the indicator light includes a plurality of front lamps provided in a front portion of the marine vessel and correspond to the plurality of traveling speed reference values, and a rear lamp provided in a rear portion of the marine vessel and correspond to at least one of the throttle opening reference value and the engine speed reference value; and
    wherein the control device compares the value related to the traveling speed detected by the sensor with each of the plurality of traveling speed reference values stored in the memory, when the value related to the traveling speed exceeds the traveling speed reference value, the control device changes an illuminating pattern of the front lamps corresponding to the traveling speed reference value which is exceeded,
    when the value related to the traveling speed is less than the traveling speed reference value, the control device compares one of the throttle opening and the engine speed detected by the at least one of the throttle opening sensor and the engine speed sensor with one of the throttle opening reference value and the engine speed reference value stored in the memory, respectively, and
    when the one of the throttle opening and the engine speed is less than the one of the throttle opening reference value and the engine speed reference value, the control device changes an illuminating pattern of the rear lamp.

2. The indicator light apparatus of claim 1, wherein the plurality of traveling speed reference values include a first traveling speed reference value, a second traveling speed reference value greater than the first traveling speed reference value, and a third traveling speed reference value greater than the second traveling speed reference value;
    wherein the plurality of the front lamps include a first, second, and third front lamps corresponding to the first, second, and third traveling speed reference values, respectively; and
    wherein the control device is configured to change an illuminating pattern of the first front lamp when the value related to the traveling speed is greater than the first traveling speed reference value, to change an illuminating pattern of the second front lamp when the value related to the traveling speed is greater than the second traveling speed reference value, and to change an illuminating pattern of the third front lamp when the value related to the traveling speed is greater than the third traveling speed reference value.

3. An indicator light apparatus of a marine vessel, comprising:
    a sensor for detecting a value related to a traveling speed of the marine vessel;
    an indicator light provided in the marine vessel; and
    a control device configured to change an illuminating pattern of the indicator light based on the value related to the traveling speed detected by the sensor;
    wherein the control device includes a memory which stores a plurality of predetermined traveling speed reference values, a predetermined value, and a history of values related to the traveling speed detected by the sensor;
    wherein the indicator light includes a plurality of front lamps provided in a front portion of the marine vessel and correspond to the plurality of traveling speed reference values, and a rear lamp provided in a rear portion of the marine vessel; and
    wherein the control device compares the value related to the traveling speed detected by the sensor with each of the plurality of traveling speed reference values stored in the memory,
    when the value related to the traveling speed exceeds the traveling speed reference value, the control device changes an illuminating pattern of the front lamps corresponding to the traveling speed reference value which is exceeded, when the value related to the traveling speed is less than the traveling speed reference value, the control device compares a difference value between a current value and a previous value related to the traveling speed detected by the sensor with the predetermined value stored in the memory, and when the difference value is greater than the predetermined value, the control device changes an illuminating pattern of the rear lamp.

4. The indicator light apparatus of claim 3, wherein the plurality of traveling speed reference values include a first traveling speed reference value, a second traveling speed reference value greater than the first traveling speed reference value, and a third traveling speed reference value greater than the second traveling speed reference value;

wherein the plurality of front lamps include a first, second, and third front lamps corresponding to the first, second, and third traveling speed reference values, respectively; and wherein the control device changes an illuminating pattern of the first front lamp when the value related to the traveling speed is greater than the first traveling speed reference value, the control device changes an illuminating pattern of the second front lamp when the value related to the traveling speed is greater than the second traveling speed reference value; and the control device changes an illuminating pattern of the third front lamp when the value related to the traveling speed is greater than the third traveling speed reference value.

5. The indicator light apparatus of claim 1, wherein the sensor is at least one of a traveling speed sensor, a throttle opening sensor of an engine, and an engine speed sensor.

6. The indicator light apparatus of claim 1, wherein the illuminating pattern of the indicator light includes a change in illuminating color of the indicator light.

7. The indicator light apparatus of claim 1, wherein the illuminating pattern of the indicator light includes a change in at least one of a character and a figure displayed by the indicator light.

8. The indicator light apparatus of claim 1, wherein the indicator light includes a plurality of lamps; and wherein the control device is configured to change a number of the lamps illuminated based on the value related to the traveling speed detected by the sensor.

9. The indicator light apparatus of claim 3, wherein the sensor is at least one of a traveling speed sensor, a throttle opening sensor of an engine, and an engine speed sensor.

10. The indicator light apparatus of claim 3, wherein the illuminating pattern of the indicator light includes a change in illuminating color of the indicator light.

11. The indicator light apparatus of claim 3, wherein the illuminating pattern of the indicator light includes a change in at least one of a character and a figure displayed by the indicator light.

12. The indicator light apparatus of claim 3, wherein the indicator light includes a plurality of lamps; and wherein the control device is configured to change a number of the lamps illuminated based on the value related to the traveling speed detected by the sensor.

13. An indicator light apparatus of a marine vessel, comprising:

a sensor for detecting a value related to a traveling speed of the marine vessel;

an indicator light provided in the marine vessel; and a control device configured to change an illuminating pattern of the indicator light based on the value related to the traveling speed detected by the sensor;

wherein the sensor includes at least one of a throttle opening sensor of an engine and an engine speed sensor;

wherein the control device includes a memory which stores a plurality of predetermined traveling speed reference values, and at least one of a predetermined throttle opening reference value and a predetermined engine speed reference value;

wherein the indicator light includes a rear lamp provided in a rear portion of the marine vessel and corresponds to at least one of the throttle opening reference value and the engine speed reference value; and wherein the control device compares the value related to the traveling speed detected by the sensor with each of the plurality of traveling speed reference values stored in the memory, when the value related to the traveling speed is less than the traveling speed reference value, the control device compares one of the throttle opening and the engine speed detected by the at least one of the throttle opening sensor and the engine speed sensor with one of the throttle opening reference value and the engine speed reference value stored in the memory, respectively, and when the one of the throttle opening and the engine speed is less than the one of the throttle opening reference value and the engine speed reference value, the control device changes an illuminating pattern of the rear lamp.

14. An indicator light apparatus of a marine vessel, comprising:

a sensor for detecting a value related to a traveling speed of the marine vessel;

an indicator light provided in the marine vessel; and a control device configured to change an illuminating pattern of the indicator light based on the value related to the traveling speed detected by the sensor;

wherein the control device includes a memory which stores a plurality of predetermined traveling speed reference values, a predetermined value, and a history of values related to the traveling speed detected by the sensor;

wherein the indicator light includes a rear lamp provided in a rear portion of the marine vessel; and wherein the control device compares the value related to the traveling speed detected by the sensor with each of the plurality of traveling speed reference values stored in the memory, when the value related to the traveling speed is less than the traveling speed reference value, the control device compares a difference value between a current value and a previous value related to the traveling speed detected by the sensor with the predetermined value stored in the memory, and when the difference value is greater than the predetermined value, the control device changes an illuminating pattern of the rear lamp.

* * * * *